(12) United States Patent
Mittonette et al.

(10) Patent No.: US 11,796,134 B2
(45) Date of Patent: Oct. 24, 2023

(54) CYLINDER VALVES AND METHODS FOR INHIBITING THE FORMATION OF CONTAMINANTS IN CYLINDERS AND CYLINDER VALVES

(71) Applicants: LINDE GMBH, Pullach (DE); David Milner, Long Valley, NJ (US)

(72) Inventors: Paul Mittonette, West Sussex (GB); David Milner, Long Valley, NJ (US); Ce Ma, Apex, NC (US)

(73) Assignee: Linde GmbH, Pullach (DE)

( * ) Notice: Subject to any disclaimer, the term of this patent is extended or adjusted under 35 U.S.C. 154(b) by 285 days.

(21) Appl. No.: 17/255,073

(22) PCT Filed: May 15, 2019

(86) PCT No.: PCT/US2019/032385
§ 371 (c)(1),
(2) Date: Dec. 22, 2020

(87) PCT Pub. No.: WO2019/245674
PCT Pub. Date: Dec. 26, 2019

(65) Prior Publication Data
US 2021/0262619 A1   Aug. 26, 2021

Related U.S. Application Data

(60) Provisional application No. 62/688,588, filed on Jun. 22, 2018.

(51) Int. Cl.
*F17C 13/04* (2006.01)
*F16K 1/30* (2006.01)
(Continued)

(52) U.S. Cl.
CPC .............. *F17C 13/04* (2013.01); *F16K 1/302* (2013.01); *F16K 27/02* (2013.01); *F17C 13/002* (2013.01);
(Continued)

(58) Field of Classification Search
CPC .... F17C 2221/015; F17C 13/04; F16K 1/302; F16K 27/02; F16K 1/46; F16K 1/02
See application file for complete search history.

(56) References Cited

U.S. PATENT DOCUMENTS

4,475,348 A   10/1984   Remes
5,237,967 A   8/1993   Willermet et al.
(Continued)

FOREIGN PATENT DOCUMENTS

EP   605992 A1 *   7/1994   ........... C23C 16/029
EP   874066 A1 *   10/1998   ......... C23C 16/0272
(Continued)

*Primary Examiner* — Jessica Cahill

(57) ABSTRACT

A method for inhibiting the formation of carbonyl compounds in a gas cylinder containing carbon monoxide wherein the gas cylinder is in fluid communication with a valve assembly wherein the valve assembly connects to a threaded opening in the gas cylinder by a threaded assembly by coating interior and exterior components of the valve assembly selected from the group consisting of an inlet port, an outlet port, a diaphragm and a lower spindle with an amorphous hydrogenated silicon compound. A valve assembly containing the coated interior and exterior components is also disclosed.

24 Claims, 2 Drawing Sheets

(51) Int. Cl.
*F16K 27/02* (2006.01)
*F17C 13/00* (2006.01)

(52) U.S. Cl.
CPC .............. *F17C 2203/0607* (2013.01); *F17C 2203/0643* (2013.01); *F17C 2203/0646* (2013.01); *F17C 2203/0648* (2013.01); *F17C 2205/0323* (2013.01); *F17C 2221/015* (2013.01); *F17C 2223/0123* (2013.01); *F17C 2260/044* (2013.01)

(56) References Cited

U.S. PATENT DOCUMENTS

| | | | | |
|---|---|---|---|---|
| 5,755,759 | A * | 5/1998 | Cogan | A61N 1/05 607/116 |
| 5,917,140 | A | 6/1999 | Tom | |
| 5,980,599 | A * | 11/1999 | Chris | F17C 5/00 55/312 |
| 7,648,682 | B2 | 1/2010 | McDermott et al. | |
| 7,905,247 | B2 * | 3/2011 | Campeau | F17C 13/04 137/906 |
| 8,297,593 | B2 * | 10/2012 | Muzzo | F16K 1/46 251/367 |
| 10,087,521 | B2 * | 10/2018 | Yuan | C23C 16/45523 |
| 10,323,321 | B1 * | 6/2019 | Yuan | C23C 16/44 |
| 2003/0084882 | A1 * | 5/2003 | Kabat | F02M 51/0671 123/499 |
| 2003/0126991 | A1 | 7/2003 | Wang et al. | |
| 2005/0160910 | A1 * | 7/2005 | Watanabe | C23C 16/4402 96/108 |
| 2008/0167403 | A1 * | 7/2008 | Burkle | C09D 183/04 524/1 |
| 2010/0228399 | A1 * | 9/2010 | Udischas | F17C 13/04 700/282 |
| 2015/0247605 | A1 * | 9/2015 | Despres | F17C 13/04 222/402.1 |
| 2017/0122496 | A1 * | 5/2017 | Scannell | F17C 13/04 |
| 2018/0239375 | A1 * | 8/2018 | Heiderman | F16K 17/30 |
| 2019/0339726 | A1 * | 11/2019 | Jones | F16K 17/24 |

FOREIGN PATENT DOCUMENTS

| | | |
|---|---|---|
| WO | 2007146888 A1 | 12/2007 |
| WO | 20180102139 A1 | 6/2018 |

* cited by examiner

CYLINDER VALVES AND METHODS FOR INHIBITING THE FORMATION OF CONTAMINANTS IN CYLINDERS AND CYLINDER VALVES

CROSS REFERENCE TO RELATED APPLICATIONS

This application claims the benefit of International Application No. PCT/US2019/032385, filed on May 15, 2019, which claimed the benefit of U.S. Provisional Application Ser. No. 62/688,588 filed on Jun. 22, 2018, which are incorporated herein by reference.

BACKGROUND OF THE INVENTION

Carbon monoxide has a variety of industrial uses. One difficulty with carbon monoxide is that it can form a metal carbonyl on contact with particular metals. For example, chromium, molybdenum, iron, nickel and cobalt can all react with carbon monoxide and form their respective carbonyl compounds.

The problem can be exacerbated in high pressure cylinders. Both iron and in particular nickel will form carbonyls at low levels when exposed to steel and stainless steel at ambient temperature and high pressures around 200 bar.

While carbon monoxide can be stored at high pressures and purities in aluminum cylinders, certain valve mechanisms can contain iron and nickel which can be introduced into the cylinder thereby reacting with the carbon monoxide present therein.

One proposed solution was to fabricate the valve from brass thereby eliminating the iron and nickel that could react with the carbon monoxide. However, brass valves can be difficult to use given the softness of the material and the potential for deforming which could result in less than gas-tight connections between the valve and the cylinder it is mounted into. Copper alloys are generally unacceptable in semiconductor applications. In many situations the customer for the gas will rule out brass, or other copper alloys as a potential material on construction.

Also, the internals of the valve are made of iron and nickel alloys whether the valve is made of brass or stainless steel The present invention is a method for inhibiting the formation of carbonyls in carbon monoxide cylinders.

SUMMARY OF THE INVENTION

The present invention provides for a method for inhibiting the formation of carbonyl compounds in a closed gas cylinder containing carbon monoxide wherein the gas cylinder is in fluid communication with a valve assembly wherein the valve assembly connects to a threaded opening in the gas cylinder by a threaded assembly comprising coated interior and exterior components of the valve assembly selected from the group consisting of an inlet port, an outlet port, and a lower spindle with an amorphous hydrogenated silicon.

In an alternative embodiment, the present invention provides for a method for inhibiting the formation of carbonyl compounds in a valve assembly wherein the valve assembly is in contact with carbon monoxide comprising coating interior and exterior components of the valve assembly selected from the group consisting of an inlet port, an outlet port, and a lower spindle with an amorphous hydrogenated silicon.

For purposes of the present invention, the interior and exterior components of the valve assembly namely the inlet port, the outlet port, the diaphragm and the lower spindle are coated with an amorphous hydrogenated silicon to provide an inert barrier. The amorphous hydrogenated silicon compound can be further augmented with functionalized group in order to provide different anti-corrosion properties for different gas types. The functionalized version is available under the Dursan trademark from SilcoTek. The non-functionalized silicon compound is available from SilcoTek under the Silcolloy trademark.

For purposes of the present invention, the amorphous hydrogenated silicon, with or without functionalized groups is coated via a chemical vapor deposition process on the surfaces of the valve assembly to be protected.

Typically, the interior and exterior components of the valve assembly are coated with the amorphous hydrogenated silicon compound before the threaded assembly is inserted into the threaded opening in the gas cylinder.

In another embodiment of the invention, the interior and exterior components of the valve assembly further comprise a diaphragm, wherein the diaphragm can be coated with the amorphous hydrogenated silicon compound.

In another embodiment of the invention, there is disclosed a valve assembly comprising a valve body having a fluid passage therethrough having inlet and outlet ports, a valve chamber in fluid communication with the inlet and outlet ports in the valve body, a first valve for opening and closing the fluid passage to control a flow of gas through the fluid passage, a threaded assembly in fluid communication with the fluid passage, a threaded assembly in communication with the outlet port, wherein the valve comprises a valve member in the form of a threaded rod, the threaded rod in contact with a valve seat upon which the rod engages in the valve-closing position, wherein the valve allows passage of the gas from the inlet port through the fluid passage to the outlet port when the rod is not engaging the valve seat, wherein the valve seat, the inlet port and the outlet port are coated with an inert barrier.

The carbonyl compounds that are formed are typically those formed by direct contact with a metal and carbon monoxide. For purposes of this invention, these are nickel carbonyls, iron carbonyls and cobalt carbonyls such as $Fe(CO)_5$, $Ni(CO)_4$. Other carbonyls may include $Cr(CO)_6$, $W(CO)_6$ and $MO(CO)_6$.

The valve will typically be fabricated from stainless steel. The valve may also contain high nickel corrosion resistant alloy such as those available under the tradenames Hastelloy and Monel. In some cases, there are pure nickel components. The wetted components, namely those that contact the carbon monoxide will be those that are coated by the inert barrier so that when the carbon monoxide is inside the cylinder, there is not contact with any steel or stainless steel.

A typical gas cylinder may have nickel, nickel lined, steel, or stainless steel that could also react with carbon monoxide present in the cylinder. Use of aluminum as the material of construction for the cylinder can be used to mitigate reactions of carbon monoxide with the cylinder itself; however, the use of a stainless steel or steel valve would still present a source of reactive material for carbon monoxide when the cylinder valve is closed.

The interior components that are susceptible to corrosion are coated with an inert barrier which amorphous hydrogenated silicon ($\alpha$Si:H). Typically, the amorphous hydrogenated silicon will be coated by chemical vapor phase deposition. In alternative embodiments, the inert barrier could be inert silicon coatings that also contain carbon and/or oxygen in their films.

The chemical vapor deposition process is typically at relatively low temperatures and can be with or without plasma to generate the amorphous hydrogen silicon coating formed.

Other coating techniques can be employed such as plasma enhanced chemical vapor deposition (PECVD), thermal conversion and electroplating.

In other embodiments, the other amorphous hydrogen silicon coating can contain different functional groups. The base silicon surface may be modified by a functional group to prevent impurity formation in the high purity gas products that can otherwise be present in the gas cylinder. Typical functional groups are selected from the groups consisting of —$SiH_3$, —H, —OH, —$CH_3$, and —F.

The advantages of using the inert barrier can be further extended to the full delivery system for high purity carbon monoxide gas, particularly in semiconductor fabrication systems. This full delivery system can comprise the gas cylinder, cylinder valve, pressure regulator, mass flow controller and delivery pressurized stainless steel lines.

Based on the chemistry discussed above, these individual unit operations can all be susceptible to carbonyl formation and can thereby be treated with the barrier coating to inhibit corrosion of the unique components.

The interior components are coated with the amorphous hydrogenated silicon by a chemical vapor deposition process. The interior components are coated with the amorphous hydrogenated silicon before the valve assembly is connected to the gas cylinder.

The inlet port, the outlet port, the diaphragm and the lower spindle are made from a material selected from the group consisting of iron and nickel.

The amorphous hydrogenated silicon compound further contains additional functionalized groups wherein the additional functionalized groups are selected from the groups consisting of oxygen and carbon.

The gas cylinder is made from a material selected from the group consisting of aluminum, nickel, nickel lined, steel and stainless steel.

DETAILED DESCRIPTION OF THE INVENTION

The valve assembly comprises a valve body having a fluid passage therethrough having inlet and outlet ports, a valve chamber in fluid communication with the inlet and outlet ports in the valve body, a first valve for opening and closing the fluid passage to control a flow of gas through the fluid passage, a threaded assembly in fluid communication with the fluid passage, a threaded assembly in communication with the outlet port, wherein the valve comprises a valve member comprising a lower spindle, an intermediary spindle and an upper spindle in the form of a threaded rod, the threaded rod in contact with a valve seat and diaphragm upon which the threaded rod engages in the valve-closing position, wherein the valve allows passage of the gas from the inlet port through the fluid passage to the outlet port when the threaded rod is not engaging the valve seat.

Figure 1:
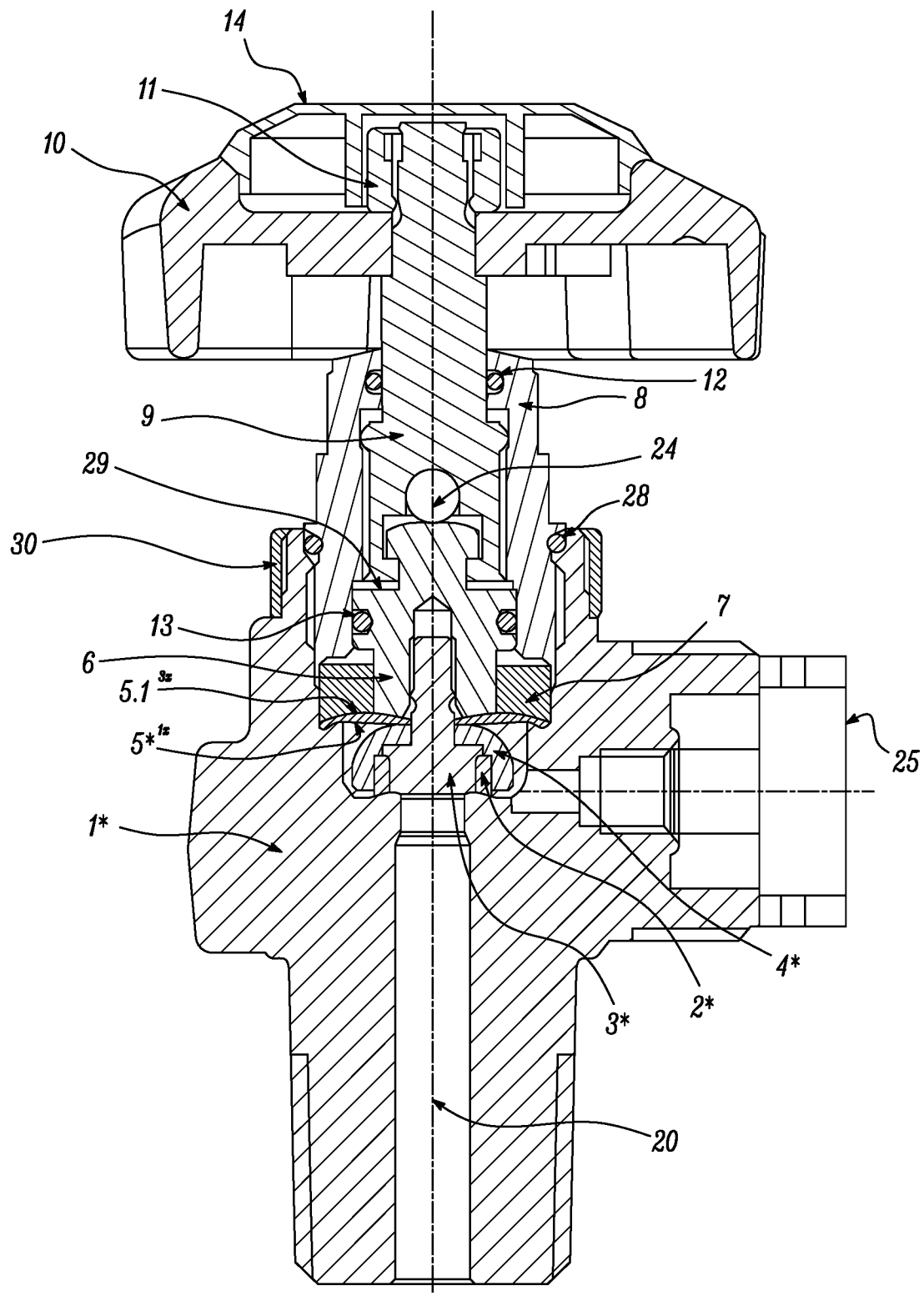
FIG. 1 is a schematic of a valve assembly that can be treated by the methods of the present invention.

In FIG. 1, a typical valve assembly 10 is shown. A main body 1 is recessed to allow for passage of the appropriate gas both into and through recessed opening or inlet port 20 and out of through recessed opening or outlet port 25. A lower spindle 3 contacts the seat disc holder or valve seat 4 and seat disc 2. A diaphragm 5 and 5.1 sits between the seat disc holder 4 and a bushing 7 to assist in blocking the passage of gas when the valve assembly 10 is supposed to be closed.

The inlet port 20 may typically be configured for fitting and mating into the top recess of a gas cylinder so that the flow of gas from the not shown cylinder passes to at least the inlet port when the valve assembly 10 is in a closed position.

The lower spindle 3 contacts an intermediary spindle 6. An O-ring 13 sits circumferentially in a groove in the intermediary spindle 6 to inhibit passage of gas around the intermediary spindle 6. A washer 29 is in physical contact with the intermediary spindle 6 and sits on top of the intermediary spindle 6 in contact with the upper spindle 9.

A gland 8 is physically mounted within the main body 1 and is configured to receive the upper spindle 9 through a concentric top opening. A bushing 7 sits within a recessed groove in the gland 8 to inhibit passage of the appropriate gas. An O-ring 28 sits circumferentially in a groove in the gland 8 to inhibit passage of the gas around the gland 8.

The intermediary spindle 6 sits within a recess in the upper spindle 9. As shown in FIG. 1, the intermediary spindle 6 has a "T" shaped member on its top. This "T" shaped member sits within a recess in the upper spindle 9 that will allow the upper spindle 9 to be raised and lowered such that the lower portion will contact the bottom of the upper spindle 9 to the "T" shaped member of the intermediary spindle 6. This configuration will occur when the valve 10 is in the closed position. The upper spindle 9 will rise within the gland 8 and break contact with the washer 29 thereby allowing gas to flow. When the "T" shaped member of intermediary spindle 6 is forced upwards by appropriate means, the upper spindle 9 will contact the washer 29 thereby opening the flow of gas.

The amount of movement or play between the "T" shaped member of intermediary spindle 6 and the opening in upper spindle 9 will also provide limits on how much movement there is in the means to move the upper spindle 9 as further detailed below.

The lower spindle 3, intermediary spindle 6 and upper spindle 9 comprise the valve member or threaded rod A threaded nut assembly 30 is designed to be screwed downwards in contact with threads on the main body 1 to lock down the gland 8 when the threaded nut assembly 30 is engaged.

A ball 24 is situated inside an appropriate opening in the upper spindle 9 and contacts the top of the spindle 9. An O-ring 12 is further positioned around the upper spindle 9 in a groove present in the gland 8.

The upper spindle 9 is mounted at its top into a nut 11. The nut 11 engages a handwheel 10 which is mounted into a cap 14. The cap allows the user to turn the cap 14 in a clockwise direction to cause the upper spindle 9 to press downwards into the washer 29 thereby closing the valve 10. The user may also turn the cap 14 in a counter-clockwise direction which will cause the intermediate spindle 6 to engage against the ball of the upper spindle 9 and allow the valve seat 4 and seat disc 2 to rise off the inlet port 20 thereby opening' the valve and allowing gas to flow through openings 20 and 25.

The passage of gas through the inlet port 20 to the outlet port 25 occurs when the threaded rod does not engage the valve seat 4. Alternatively, when the threaded rod engages the valve seat 4, the flow of gas from the inlet port 20 to the outlet port 25 stops.

As shown in FIG. 1, during flowing conditions, when the valve is open, the openings 20 and 25 are clearly wetted by the gas that is present in the cylinder in which the valve 10 sits. This area of contact would further include the seat disc holder 4 through to the bottom of the diaphragm assembly represented by 5 and 5.1 and the lower spindle assembly 3. These areas of the valve assembly 10 can often contain iron or nickel and by coating them, the formation of carbonyl compounds is inhibited. During static conditions when the valve assembly 10 is closed, only opening 20 and the bottom of the lower spindle assembly 3, will be wetted by the gas. The inlet opening 20 to the valve assembly from the cylinder connection as well as the outlet port opening 25 for delivering the gas are coated.

Figure 2:
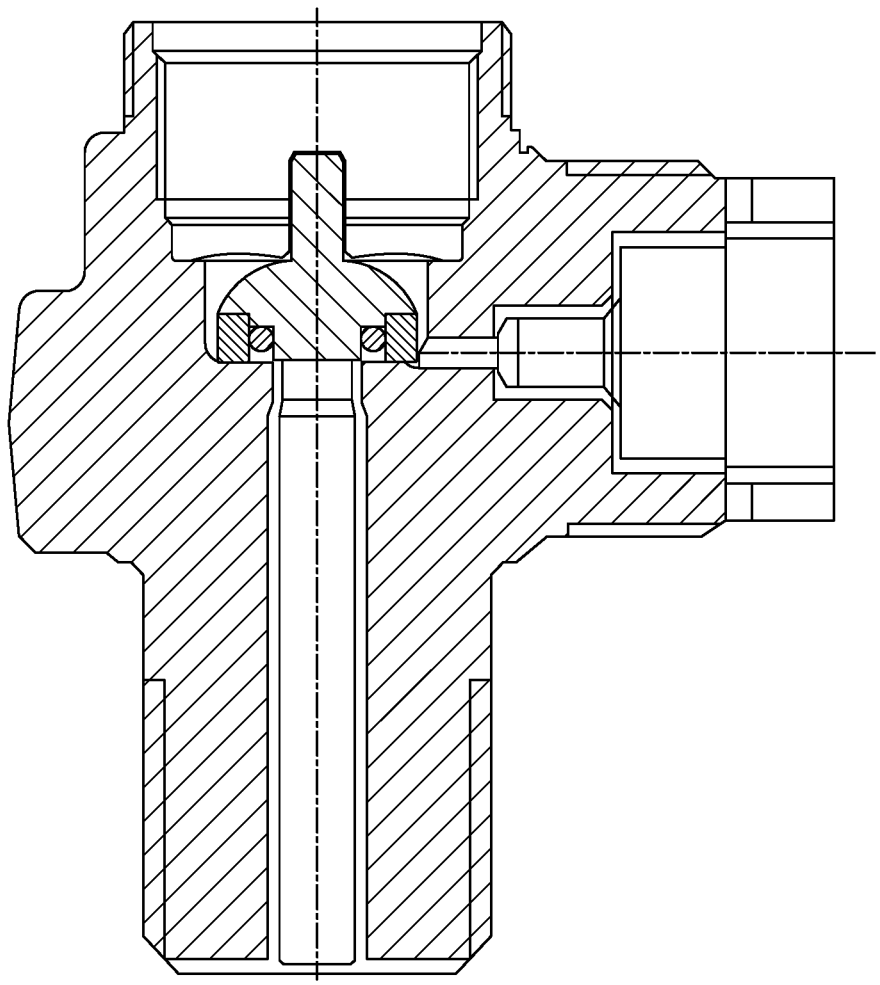
FIG. 2 is a schematic representation of a cutaway valve showing the pathways of the valve exposed to carbon monoxide, and the shaded areas where the inert barrier is applied.

These areas of the valve assembly are further highlighted in FIG. 2 which is a schematic of a cutaway of the interior of a typical valve used in the methods of the present invention. As noted above with regards to the description of FIG. 1, the inlet port to the valve assembly from the cylinder connection, the outlet port for withdrawing the carbon monoxide and the "wetted components" are all visible. The lower spindle assembly and the diaphragm have also been highlighted in FIG. 2 as these components of the valve can be coated by the methods of the present invention to inhibit formation of carbonyl compounds.

In certain embodiments, a pressure regulator for operating the valve assembly to regulate the gas pressure in the fluid passage is in fluid communication with the valve assembly.

The straight amorphous hydrogenated silicon can be employed with normal usage of the cylinder and valve assembly. When other corrosive gases besides carbon monoxide are employed, the functionalized version of the amorphous hydrogenated silicon compound can be used.

The use of the functionalized version is particularly useful when the cylinder is made from aluminum which, although it does not react with carbon monoxide, may react with other corrosive gases so coating the interior of the aluminum cylinder will inhibit the formation of other reaction products besides carbonyl compounds which can cause problems with the quality of gas as well as proper operation of the cylinder and valve assembly.

The result of inhibiting the formation of carbonyls and minimizing the impurities entering the system will allow an end user, particularly in a semiconductor fabrication facility to substitute the cylinder and valve arrangement into their operation knowing that the product being supplied will contain part per trillion levels of impurities as measured at the time of filling and that no further carbonyl formation has taken place inside the cylinder or valve during storage.

While this invention has been described with respect to particular embodiments thereof, it is apparent that numerous other forms and modifications of the invention will be obvious to those skilled in the art. The appended claims in this invention generally should be construed to cover all such obvious forms and modifications which are within the true spirit and scope of the invention.

Having thus described the invention, what we claim is:

1. A method for inhibiting the formation of carbonyl compounds in a closed gas cylinder containing carbon monoxide wherein the gas cylinder is in fluid communication with a valve assembly wherein the valve assembly connects to a threaded opening in the gas cylinder by a threaded assembly comprising coating interior and exterior components of the valve assembly selected from the group consisting of an inlet port, an outlet port, and a lower spindle with an amorphous hydrogenated silicon compound.

2. The method as claimed in claim 1 wherein the interior components are coated with the amorphous hydrogenated silicon by a chemical vapor deposition process.

3. The method as claimed in claim 1 wherein the interior components are coated with the amorphous hydrogenated silicon before the valve assembly is connected to the gas cylinder.

4. The method as claimed in claim 1 wherein the inlet port, the outlet port, and the lower spindle are made from a material selected from the group consisting of iron and nickel.

5. The method as claimed in claim 1 wherein the interior and exterior components further comprise a diaphragm.

6. The method as claimed in claim 1 wherein the amorphous hydrogenated silicon compound further contains additional functionalized groups.

7. The method as claimed in claim 6 wherein the additional functionalized groups are selected from the groups consisting of oxygen and carbon.

8. The method as claimed in claim 1 wherein the gas cylinder is made from a material selected from the group consisting of aluminum, nickel, nickel lined, steel and stainless steel.

9. A method for inhibiting the formation of carbonyl compounds in a valve assembly wherein the valve assembly is in contact with carbon monoxide comprising coating interior and exterior components of the valve assembly selected from the group consisting of an inlet port, an outlet port, and a lower spindle with an amorphous hydrogenated silicon compound.

10. The method as claimed in claim 9 wherein the interior components are coated with the amorphous hydrogenated silicon by a chemical vapor deposition process.

11. The method as claimed in claim 9 wherein the interior components are coated with the amorphous hydrogenated silicon before the valve assembly is connected to a gas cylinder.

12. The method as claimed in claim 9 wherein the inlet port, the outlet port, and the lower spindle are made from a material selected from the group consisting of iron and nickel.

13. The method as claimed in claim 9 wherein the interior and exterior components further comprise a diaphragm.

14. The method as claimed in claim 9 wherein the amorphous hydrogenated silicon compound further contains additional functionalized groups.

15. The method as claimed in claim 14 wherein the additional functionalized groups are selected from the groups consisting of oxygen and carbon.

16. The method as claimed in claim 9 wherein a gas cylinder is made from a material selected from the group consisting of aluminum, nickel, nickel lined, steel and stainless steel.

17. A valve assembly comprising a valve body having a fluid passage therethrough having inlet and outlet ports, a valve chamber in fluid communication with the inlet and outlet ports in the valve body, a first valve for opening and closing the fluid passage to control a flow of gas through the fluid passage, a threaded rod in fluid communication with the fluid passage, the threaded rod in communication with the inlet port and the outlet port, wherein the valve comprises a valve member comprising a lower spindle, an intermediary spindle and an upper spindle in the form of the threaded rod, the threaded rod engages with a valve seat and diaphragm upon which the threaded rod engages in the valve-closing position, wherein the valve allows passage of the gas from the inlet port through the fluid passage to the outlet port when the threaded rod is not engaging the valve seat, and the inlet port, the outlet port, and the valve seat are coated with an amorphous hydrogenated silicon compound.

18. The valve assembly as claimed in 17 wherein the hydrogenated silicon compound is coated on the surface of the inlet port, the outlet port, and the valve seat by a chemical vapor deposition process.

19. The valve assembly as claimed in claim 17 wherein the inlet port, the outlet port, the valve seat and the diaphragm are coated with the amorphous hydrogenated silicon before the valve assembly is connected to a gas cylinder.

20. The valve assembly as claimed in claim 17 wherein the inlet port, the outlet port, the diaphragm and the lower spindle are made from a material selected from the group consisting of iron and nickel.

21. The valve assembly as claimed in claim 17, wherein the diaphragm is coated by the amorphous hydrogenated silicon compound.

22. The valve assembly as claimed in claim 17 wherein the amorphous hydrogenated silicon compound further contains additional functionalized groups.

23. The valve assembly as claimed in claim 22 wherein the additional functionalized groups are selected from the groups consisting of oxygen and carbon.

24. The valve assembly as claimed in claim 17, further comprising a gas cylinder made from a material selected from the group consisting of aluminum, nickel, nickel lined, steel and stainless steel.

\* \* \* \* \*